Sept. 11, 1928.  1,683,876
W. E. DUTHIE
VALVE GRINDER AND MECHANICAL MOVEMENT
Filed Oct. 22, 1926  2 Sheets-Sheet 1
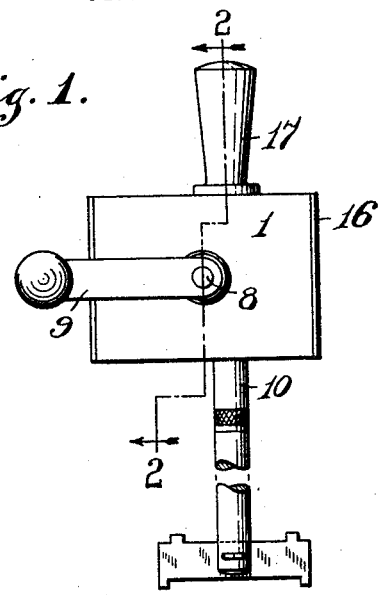
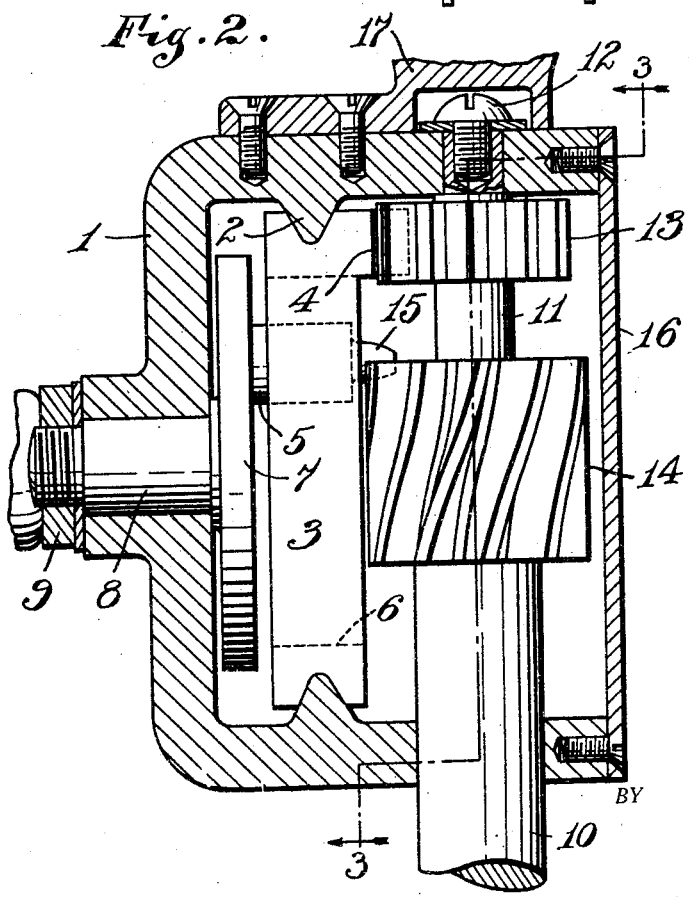
INVENTOR.
William E. Duthie,
BY
Hood + Hahn.
ATTORNEYS

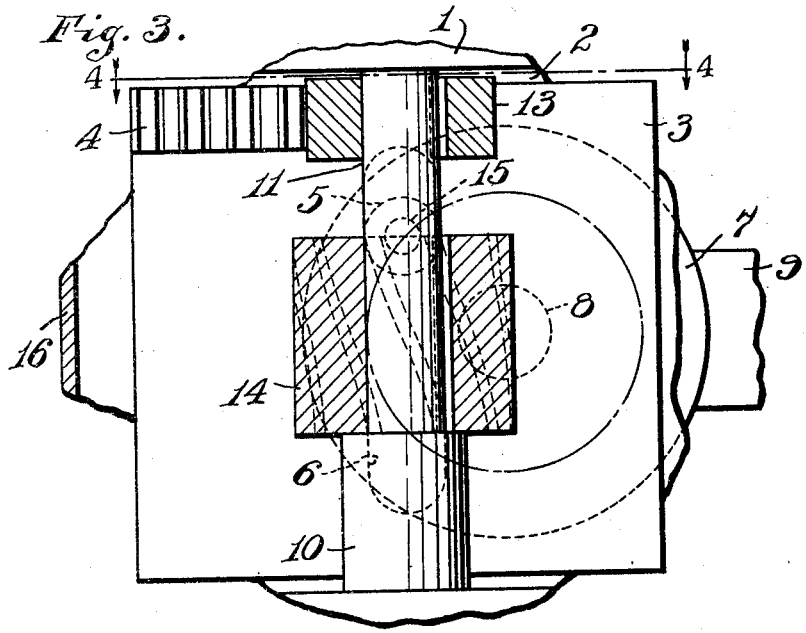
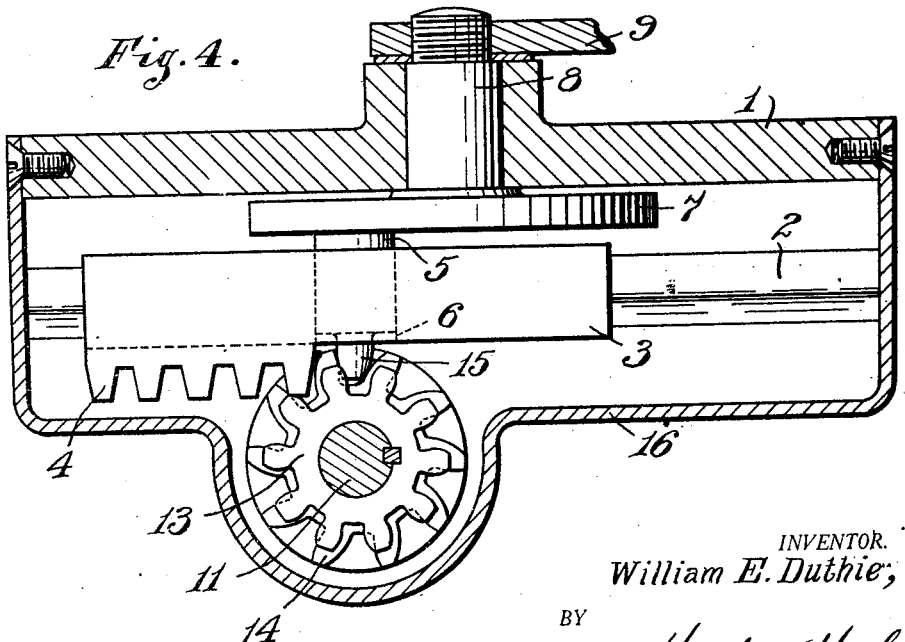

Patented Sept. 11, 1928.

1,683,876

UNITED STATES PATENT OFFICE.

WILLIAM E. DUTHIE, OF INDIANAPOLIS, INDIANA.

VALVE GRINDER AND MECHANICAL MOVEMENT.

Application filed October 22, 1926. Serial No. 143,366.

My invention relates to improvements in apparatus for producing mechanical movement and is particularly designed for imparting an oscillatory movement to a shaft and between the oscillations advancing said shaft step by step in a rotative direction.

My invention is particularly applicable to apparatus for grinding valves of explosive engines.

For the purpose of disclosing my invention I have illustrated one embodiment thereof in the accompanying drawings in which Fig. 1 is a side elevation of a valve grinder embodying my invention;

Fig. 2 is a sectional view on the line 2—2 of Fig. 1;

Fig. 3 is a sectional view on the line 3—3 of Fig. 2;

Fig. 4 is a sectional view on the line 4—4 of Fig. 3.

In the embodiment illustrated I provide a suitable enclosing casing 1 having inwardly facing ribs 2 on the inner walls thereof which ribs provide slide tracks for a reciprocating head 3 which is arranged within the casing and adapted to reciprocate transversely. This head has mounted or formed thereon an operating rack 4. The head is driven by a crank pin 5 operating in a longitudinal slot 6 formed in the head and mounted on a disc 7 arranged between the head and one side wall of the casing. This disc 7 is mounted on a shaft 8 journaled in the side wall of the casing and provided at its outer end with a crank arm 9 for rotating the same.

The shaft 10 to be oscillated is journaled in the casing and preferably has its upper end reduced as at 11, and fitted within the top wall of the casing being held in position by a screw 12 which extends through the casing, and takes into a threaded socket in the top of the shaft. A pinion 13 mounted on the upper end of the shaft meshes with the rack 4 and as the rack reciprocates with the head 3 oscillates the shaft 10. In addition to the pinion 13 there is mounted on the shaft 10, preferably on the reduced portion 11 thereof, a helical gear 14 which is adapted to be engaged by an extension 15 of the pin 5 during the downward movement of said pin. The rack and the helical gear are so proportioned that as the last tooth of the rack moves out of engagement with the pinion 13 the projection 15 will move into engagement with the teeth of the helical gear so that the shaft 10 is always locked to one or the other of the members. As the pin 15 passes down through the teeth of the helical gear 14 the shaft 10 will be advanced the distance of one tooth in its rotative movement and as the tooth 15 leaves engagement with the helical gear the rack 4 will engage the pinion 13 rotating the shaft 10 in a reverse direction. It is thus seen that an oscillating movement is imparted to the shaft 10 by the rack and pinion and between the oscillations the shaft is advanced rotatively in one direction.

The casing 1 is preferably closed by a cover plate 16 and when the device is used as a valve grinder the end of the shaft 10 is provided with a valve engaging head. A handle 17 is also secured to the top of the casing to enable the operator to support and guide the device.

I claim as my invention:

1. In a device of the character described, the combination with a shaft having a pinion thereon, of a reciprocating rack meshing with said pinion, a crank member for reciprocating said rack, a helical gear mounted on said shaft and an extension on said crank member engaging said helical gear during a portion of the movement of said crank member for rotating the shaft independently of the rack and gear connection.

2. In a device of the character described, the combination with a shaft having a gear mounted thereon, a reciprocating head, a rack mounted on said head and engaging said gear, a slot in said head extending at right angles to the line of movement of the head, a crank arm engaging in said slot for imparting a reciprocatory movement thereto and a helical gear mounted on said shaft and engaged by said crank arm during its movement in said slot for rotating the shaft independently of the rack and gear.

3. In a device of the character described, the combination with a shaft having a gear mounted thereon, of a reciprocating rack arranged to engage said gear during its reciprocatory movement, a crank arm for reciprocating said rack and a helical gear mounted on said shaft engaged by said crank arm for rotating the shaft independently of said rack, said crank arm being adapted to move into engagement with and out of engagement from said gear as the rack moves out of engagement from and into engagement with said gear.

4. In a device of the character described, the combination with a shaft having a gear mounted thereon, a reciprocable rack driving said gear and periodically drivingly disconnected therefrom, a crank arm for operating said rack and a helical gear on said shaft engaged by said crank arm during the non-driving period of the rack for rotating the shaft independently of the rack and gear.

In witness whereof, I WILLIAM E. DUTHIE have hereunto set my hand at Indianapolis, Indiana, this 20th day of October, A. D. one thousand nine hundred and twenty six.

WILLIAM E. DUTHIE.